Feb. 16, 1971  J. A. WILLIAMSON  3,564,393
CIRCUIT USING CAPACITOR AND SWITCH ON PRIMARY WINDING
OF TRANSFORMER FOR REGULATING VOLTAGE ON
SECONDARY WINDING OF TRANSFORMER
Filed March 12, 1969  2 Sheets-Sheet 1

INVENTOR.
JAMES A. WILLIAMSON
BY
Robert G. Rogers
ATTORNEY

INVENTOR.
JAMES A. WILLIAMSON
BY Robert G. Rogers
ATTORNEY

United States Patent Office 3,564,393
Patented Feb. 16, 1971

3,564,393
CIRCUIT USING CAPACITOR AND SWITCH ON PRIMARY WINDING OF TRANSFORMER FOR REGULATING VOLTAGE ON SECONDARY WINDING OF TRANSFORMER
James A. Williamson, Fullerton, Calif., assignor to North American Rockwell Corporation
Filed Mar. 12, 1969, Ser. No. 806,484
Int. Cl. G05f 1/56
U.S. Cl. 323—17                                      4 Claims

ABSTRACT OF THE DISCLOSURE

A system detects changes in the output voltage on the input side of a transformer used by the system and generates a control signal in response to the change for changing the power transferred to the output side of the transformer. The input and output have ground isolation. As a result of controlling the power transferred to the output side, the output voltage is maintained at a constant level.

BACKGROUND OF THE INVENTION

(1) Field of the invention

The invention relates to an output voltage regulator and more particularly to an output voltage regulator in which variations in the output voltage are detected on the input side of the transformer used in the regulator.

(2) Description of prior art

Certain voltage regulators generate regulated output voltages by detecting voltage changes at the output of the regulator. The changes are fed back to the input to control the output. It is important to isolate the ground connection of the output from the ground connection of the input. Complex circuitry is usually required to maintain ground isolation in the feedback loop.

It is more desirable to be able to detect the voltage changes on the primary side of the transformer used in the regulator without the necessity for complex and costly feedback circuitry. Tht present invention provides such a circuit.

SUMMARY OF THE INVENTION

Briefly, the invention comprises a capacitor connected to a primary side of the transformer used in the voltage regulator. The capacitor cyclically charges or discharges in response to changes in the voltage on the output, or secondary side of the transformer. The regulator also includes a means for comparing a voltage proportional to the charge on the capacitor with a reference voltage for generating a control signal. The signal controls the period a switching device, in series with the primary side of the transformer, remains on after being triggered at the beginning of a cycle. The capacitor is connected between the primary transformer winding and the switching device.

The "on" period of the switching device is a function of the change in the output voltage. If the output voltage increases, the "on" time of the switching device is decreased whereas if the output voltage decreases, the "on" time of the switching device increases.

Means are provided on the secondary side of the transformer for preventing conduction until the switching device is turned off. When the device is switched off, the power generated in the input side of the transformer is transferred to the output side to regulate the output voltage.

As a result of sensing the output voltage change on the input side of a transformer, the necessary ground isolation between the input and output is achieved without the necessity for costly and complex circuitry. The power delivered each cycle to the output side of the transformer, is a function of the previously detected change in the output voltage at the end of the cycle so that the output voltage is held constant.

Therefore, it is an object of this invention to provide an improved output voltage regulator in which changes in the output voltage are detected on the input side of the regulator.

It is still another object of this invention to provide an output voltage regulator using a transformer in which changes in the output voltage are detected on the primary side of the transformer.

A still further object of this invention is to provide a relatively simple output voltage regulator in which power transferred from the primary to the secondary side of a transformer used in the regulator varies as a function of the change in the output voltage as detected at the end of a previous cycle.

It is another object of this invention to maintain ground isolation between an input and an output of a voltage regulator which controls the output voltage by detecting output voltage changes on the input side of a transformer used by the regulator.

A still further object of this invention is to provide an improved output voltage regulator in which output voltage changes are detected on the input side of the regulator transformer for controlling the power transferred to the secondary side during the next regulator cycle.

A still further object of this invention is to charge a capacitor connected to the input side of the transformer to the output voltage at the end of a cycle and in which a control signal is generated as a function of the voltage on the capacitor for maintaining the output voltage constant.

These and other objects of the invention will become more apparent when taken in connection with the description of drawings, a brief description of which follows:

DESCRIPTION OF PREFERRED EMBODIMENT

Figure 1:
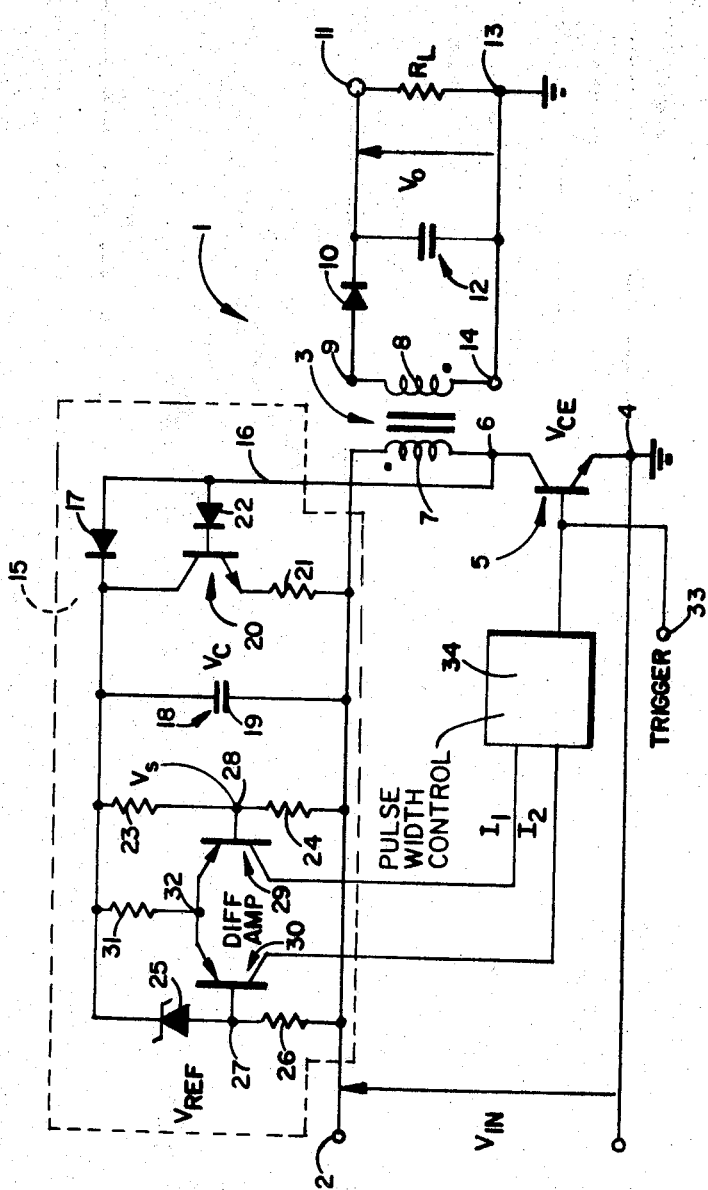
FIG. 1 is a schematic illustration of the output voltage regulator.

FIG. 1 illustrates voltage regulator 1 comprising input terminal 2 connected to one side of transformer 3 and ground terminal 4 connected through switching device 5 to the other side of transformer 3. Switching device 5, for the embodiment shown, comprises a power transistor having its emitter connected to ground and its collector connected to terminal 6 of primary winding 7 of transformer 3. The dot on the transformer indicates its polarity relative to the polarity of secondary winding 8 of the transformer. Terminal 9 of the secondary winding 8 is connected through diode 10 to output terminal 11. Capacitor 12 is connected between the output terminal 11 and ground terminal 13. Capacitor 12 is relatively large so that it does not lose sufficient charge between charging intervals to change the output voltage $V_o$, appreciably unless the load changes. Terminal 14 of the secondary winding is also connected to ground.

Detection circuit 15 includes conductor 16 connected to the collector of switching device 5 and to terminal 6 of primary winding 7. Diode 17 conducts when the voltage on its anode side exceeds the voltage, $V_c$, across the capacitor 18. Plate 19 of the capacitor is connected to the input terminal 2. Transistor 20 has its collector connected to the cathode of diode 17 and its emitter connected through resistor 21 to the input terminal 2. Its base electrode is connected through diode 22 to terminal 6 of primary winding 7. The voltage divider network comprising resistors 23 and 24 is connected between the cathode of diode 17 and input terminal 2, as shown. Zener diode 25 and resistor 26, also connected between the cathode side of diode 17 and input terminal 2, provide a reference voltage level, $V_R$, at point 27. Point 28, between resistors 23 and 24, provide a comparison or sense voltage $V_s$ which is proportional to the voltage, $V_c$, across capacitor 18. The comparison voltage, $V_s$, changes as a function of a change in the output voltage, $V_c$. Points 27 and 28 are connected to the base electrodes of transistors 30 and 29, respectively. The output from transistor 29, $I_1$, and the output from transistor 30, $I_2$, provide input signals into pulse width control circuit 34. The emitters of the transistors 29 and 30 are connected together at point 32 for implementing a differential amplifier. Resistor 31 is connected between point 32 and the cathode of diode 17 to provide a constant current into the differential amplifier. The currents increase or decrease relative to each other as a function of a change in the output voltage. The sum of the currents is always constant.

The currents $I_1$ and $I_2$ control the period switching device 5 remains on during a cycle. A cycle is determined by the frequency of the trigger pulse on trigger input terminal 33. The control signal for holding device 5 on during the cycle is generated by pulse width control means 34 which may, for example, be a one shot multivibrator having its capacitors charged as a function of the difference between the currents $I_1$ and $I_2$.

Figure 2:
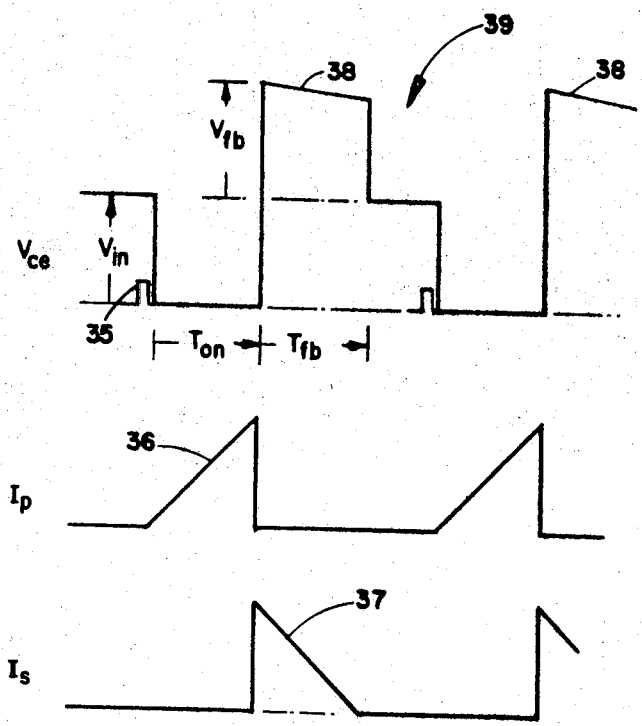
FIG. 2 is an illustration of waveforms developed by the circuit during one cycle.

The operation of the circuit can best be understood by referring to FIG. 2 which illustrates the waveforms generated by the regulator during its operation. The voltage across switching device 5, $V_{ce}$, is shown as equaling the input voltage, $V_{in}$, just prior to the input of triggering pulse 35. The triggering pulse turns switching device 5 on so that the voltage between the collector and emitter, $V_{ce}$, is approximately zero. After the transistor is turned on, current flows in the primary 7 of the transformer 3, as illustrated by current waveform 36. The current increases linearly until the switching transistor is turned off as a function of the charge on capacitor 18, stored during a previous cycle.

When device 5 turns off, the voltage across the primary 7 instantaneously changes so that the voltage across the secondary winding 8 also changes. When the switching device was on, the polarity of the voltage across the primary was such that the secondary voltage was negative on the anode side of diode 10. As a result, when switching device 5 was on, there was no secondary current. However, when the switching device turned off, the voltage change on the primary side of the transformer was such that the secondary voltage becomes positive on the anode of diode 10. The anode conducts so that the energy generated in the primary side of the transformer during the on time of device 5, is transferred to the output terminal 11.

Assuming $V_2$ across secondary winding 8 to be nearly constant, the secondary current $I_s$, decreases linearly to zero as shown by waveform 37 during the time required for the energy to be transferred. That period of time is commonly referred to as the "flyback" time ($T_{fb}$) identified at the base of waveform 39 in FIG. 2. At the beginning of the flyback time, the voltage across secondary winding 8, $V_2$, comprising the drop across diode 10, $V_{cr}$, the internal transformer drop and the output voltage, $V_o$, is sensed at terminal 6 of the primary winding as the flyback voltage $V_{fb}$. As a result, the voltage at point 6 equals the input voltage $V_{in}$ plus the flyback voltage $V_{fb}$. The magnitude of the flyback voltage is a function of the turns ratio of transformer 3. For purposes of this embodiment, a 1:1 ratio is assumed. It is pointed out that the primary and secondary have isolated ground connections.

As the secondary current approaches zero, the voltage across the output side of the transformer, approaches the output voltage $V_o$. As a result, the voltage at the end of the period during which secondary current flows, should be used in determining the power to be transferred to the secondary during the next cycle.

That regulation is achieved by means of the detector circuit 15 which is referenced to the input voltage since the lower half of the detector is connected to terminal 2.

Capacitors 18 is charged through diode 17 to the value of the voltage by which collector voltage of transistor 5, at terminal 6, exceeds the input voltage. In other words, the capacitor is charged to the value of the flyback voltage. During the flyback period, when secondary current is flowing, transistor 20 is turned on so that capacitor 18 is allowed to discharge as a function of the change in the voltage at point 6. As a result, the capacitor voltage varies as a function of the decrease in the flyback voltage as shown by the sloped portion 38 of waveform 39. The decrease is due to the fact that as the secondary current approaches zero, the drop across diode 10 and the internal impedance of secondary winding 8 are reduced.

At the end of the flyback period, the collector of transistor 20 drops to the level of the input voltage, $V_{in}$, so that diode 17 and transistor 20 stop conducting. At that time, capacitor 18 is charged to the level of the flyback voltage at the end of the flyback period. The capacitor then supplies current to the comparator circuit comprising resistors 23 and 24 and to the reference circuit comprising Zener diode 25 and resistor 26.

Capacitor 18 is made relatively large so that the current drain during the period prior to the next cycle results in a negligible change in its voltage. The differential amplifier comprising transistors 29 and 30 generate signals $I_1$ and $I_2$ which have relative magnitudes proportional to the difference in the voltages at points 27 and 28.

As previously indicated, the currents $I_1$ and $I_2$ may be used in one embodiment to charge a capacitor in a multivibrator so that it generates a control signal at the base of switching device 5.

By way of further illustration, assume that the output voltage increases, for example, when the output load ($R_L$) increases. In that case, the voltage across the capacitor at the end of the flyback time would be larger and the $I_1$ current would increase so that the "on time," $T_{on}$, of switching device 5 would be reduced. When the on time of device 5 is reduced, the energy transferred from the primary to the secondary is reduced and the output voltage would be decreased to its previous constant level. If the opposite change were to occur, i.e., if the output voltage decreased, $V_c$ would decrease $I_2$ would increase to increase the period that device 5 is on. If the on period is increased, the energy transferred is greater so that the voltage is increased to its previous level.

The regulator described above has the advantage of being adaptable in that a simple change in the transformer turns ratio is the only modification required to give a different output voltage. Therefore, it is not necessary to change component values in the detector to accommodate different output voltages. Consequently, an array of regulators substantially as shown in FIG. 1, can be designed for a given selection of output voltages which have a high degree of interchangeability of parts.

The system can also be used on a half-wave switching regulator, a multiple output flyback system, a multiple output regulator that is a combination of a half-wave and a flyback system, or on any circuit where the voltage reflected on the primary side of the transformer is proportional to the output voltage.

While the invention has been described with respect to several physical embodiments constructed in accordance therewith, it will be apparent to those skilled in the art that various modifications and improvements may be made without departing from the scope and spirit of the invention.

I claim:
1. An output voltage regulator having an input terminal and an output terminal with isolated ground connections, said regulator comprising
   a transformer having its primary winding connected to said input terminal and having its secondary winding connected to said output terminal,
   a capacitor connected to said primary winding for charging to a voltage proportional to the voltage across said secondary winding during the time energy is transferred from the primary winding to the secondary winding,
   means for providing a reference voltage,
   means for comparing said reference voltage with a voltage proportional to the voltage of said capacitor including means for generating an output pulse having a pulse width equivalent to the difference in said voltages,
   switch means connected to said primary winding including means responsive to said output pulse for controlling the amount of energy transferred between said primary and secondary windings.

2. An output voltage regulator having an input terminal and an output terminal with isolated ground connections, said regulator comprising,
   a transformer having its primary winding connected to said input terminal and having its secondary winding connected to said output terminal,
   a capacitor connected to said primary winding for charging to a voltage during the time energy is transferred from the primary winding to the secondary winding,
   means for providing a reference voltage,
   means for comparing said reference voltage with a voltage proportional to the voltage of said capacitor including means for generating an output pulse proportional to the difference in said voltages,
   switch means connected to said primary winding including means responsive to said output pulse for controlling the amount of energy transferred between said primary and secondary windings,
   said switch means connected between said primary winding and the electrical ground on the input side of the regulator, and one plate of said capacitor connected between said switching device and said primary winding for detecting changes in said output voltage, and the other plate of said capacitor connected to said input terminal for referencing changes in the voltage at the output terminal to the input voltage.

3. The combination recited in claim 2 wherein said regulator further includes means connected between said secondary winding and said output terminal for preventing current flow in said secondary winding during the period of said cycle that energy is generated in said primary winding, said means including means for enabling conduction when said switch means is turned off so that the energy generated in said primary winding is transferred to said secondary winding for maintaining said output voltage at a constant level.

4. The combination recited in claim 2 wherein said means for providing a reference voltage is referenced to said input voltage.

References Cited

UNITED STATES PATENTS

| | | | |
|---|---|---|---|
| 3,219,911 | 11/1965 | Burfeindt | 323—22(T) |
| 3,302,130 | 1/1967 | Minks | 321—2X |
| 3,387,228 | 6/1968 | Randall | 321—2X |
| 3,453,521 | 7/1969 | Schultz et al. | 321—2 |

J D MILLER, Primary Examiner

A. D. PELLINEN, Assistant Examiner

U.S. Cl. X.R.

321—2; 323—22, 38